United States Patent Office 3,470,853
Patented Oct. 7, 1969

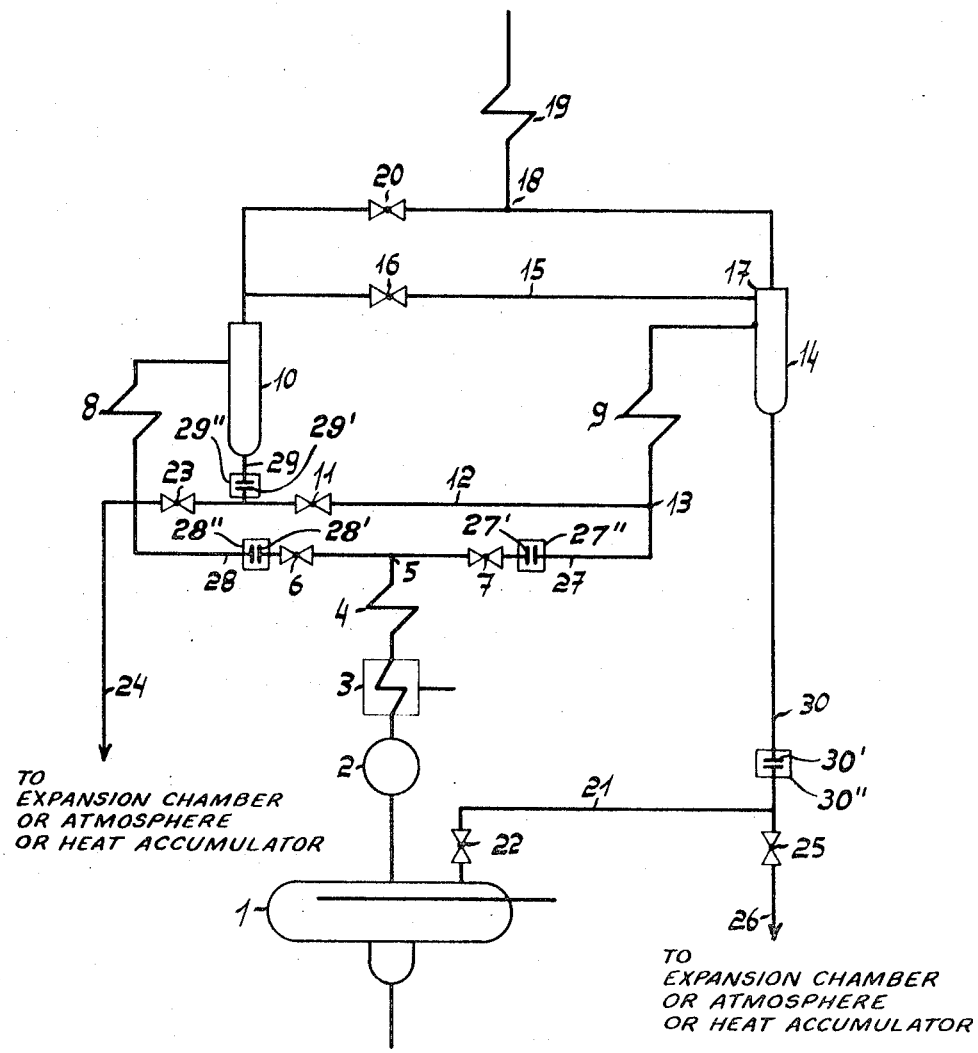

3,470,853
STEAM PRODUCING PLANT AND METHOD OF OPERATING THE SAME
Klaus Knizia, Nochen uber Engelskirchen, Germany, assignor to L & C Steinmuller G.m.b.H., Gummersbach, Germany
Filed Sept. 8, 1967, Ser. No. 666,305
Int. Cl. F22d 7/00
U.S. Cl. 122—406                                    8 Claims

ABSTRACT OF THE DISCLOSURE

A steam generating plant with forced circulation and method of operating the same according to which the conduit means including surfaces to be heated are so controlled that they will be arranged in series during the starting and the closing down phase of the plant and also when operating the plant under partial load, whereas said conduits will be operated in parallel when operating the plant under normal conditions.

---

The present invention relates to a steam producing plant and method of operating the same, and in particular is directed to a method of operating a two-or-more line steam producing plant operated with forced circulation, with or without separating vessels, especially when starting and closing the plant under partial load.

It is known to protect the heating surfaces, especially the evaporator, of steam producers operated with forced circulation, during the starting and the closing down and when under partial load, by means of a second fluid medium flow which is superimposed upon the feed water flow. In this way, the mass flow in heating surfaces which are endangered by high heat flow densities is increased and counteracts a thermal over-stress of these heating surfaces to a considerable extent.

This circulating system, in addition to an additional circuit for the working medium, also requires circulating pumps built into said circuit, which pumps automatically require an increase in the energy consumption.

It is, therefore, an object of the present invention to provide a plant of the above-mentioned general type which will avoid temperature differences.

It is another object of this invention to provide a plant of the general character set forth above, which will make it possible to operate the boiler installation without additional circulating pumps.

These and other objects and advantages of the invention will appear more clearly from the following specification in connection with the accompanying drawing diagrammatically illustrating a plant according to the present invention.

The present invention is based on the finding that when starting and closing down the plant and also when operating under partial loads, an endangering of the heating surfaces by too high heat flow densities can be avoided when the working medium during these phases of operation is correspondingly passed through the pipe system. The present invention is characterized primarily in that the heating surfaces which, during normal operation are in parallel arrangement will, during the starting and closing down phase or when operating under partial loads, all or partially be continuously arranged in series.

The present invention is not limited to a method of operating a two-or multi-line steam producing installation operated with forced circulation with or without separating vessels, but also comprises a circuit for carrying out the method, which circuit will be described further below in connection with a two-line steam producing plant operated with forced circulation.

Referring now to the drawing in detail, the feed water is withdrawn from the feed water container 1 and is by means of a feed pump 2 pressed into the high pressure pre-heater 3 and from there into the economizer (eco) 4 of the boiler. Either after or ahead of the member 4, the boiler is subdivided into two systems which are separated at the evaporator side. These systems are during normal operation acted upon by equal feed water pressure flows in conformity with the load, while the so-called line control valves 6 and 7 equalize the mass flow in both lines with regard to each other.

During the starting phase, the line control valve 7 is closed and the entire feed water quantity is pressed through the line control valve 6 through the evaporator 8 of one line into the first separating vessel 10. From here the feed water flow passes through control valve 11, and conduit 12 into the feeding-in point 13, then passes through the evaporator 9 of the second line, and finally is conducted from the second separating vessel 14 through conduit 21 and control valve 22 fed back into the feed water container 1.

With the firing of the boiler and the increase in the firing output, a portion of the water in both evaporator systems will evaporate, while in the separating vessel 10 of the first system a separation will be carried out into liquid and vaporous water. The steam passes through control valve 20 toward the heating surfaces 19. The liquid water passes into the evaporator 9 of the second system. Here heat is conveyed again to the evaporator, and in the second separating vessel 14 a further separation into the steam and liquid phase will be effected. The steam thus produced likewise passes at the inlet point 18 into the next following heating surface 19.

With further increase in the firing output, the feed-in feed water quantity in the two steam producing heating surfaces will be very quickly evaporated to such an extent that in the separating vessel 14 there will be obtained only a small quantity of liquid water or none at all.

With a still further increase in the firing output, also the feed water quantity is increased while the line control valve 7 first remains closed. In conformity with the loss in pressure, which loss occurs in the evaporator surface 9 of the second line, the steam separation in the first separating vessel 10 will be effected at a higher pressure than in the second separating vessel 14. An over-feeding of the first separating vessel 10 through control valves 20 or 16 will be avoided due to the fact that there always remains a steam cushion in the separating valve 10. The control valve 16 with conduit 15 can likewise in the starting phase be taken advantage of for adjusting a water level in the first separating vessel 10 while the feeding-in of this conduit at 17 into the second separating vessel 14 is intended to prevent that during the first phase of the starting operation a semi-liquid mixture can enter the next following heating surface at 19. When the feed water flow has increased to such an extent that the mass flow density with the thus serially arranged evaporator surfaces 8, 9 exceeds an economically or technically necessary value, the excess of feed water is, through the control valve 7, added directly to the evaporator 9 of the second system. The following load increase will by a further opening of the valve 7 bring about that the two evaporator heating surfaces 8, 9 are continually arranged in parallel so that the normal operation of the steam producer can be practiced. This way of operation can also be practiced in the reverse manner when gradually closing down the boiler, and stationarily when operating under low loads.

The feed water quantities which are to be returned into the feed water container through conduit 21 and control valve 22 are at the starting phase practically not warmed up and will with increasing heat absorption in the boiler drop quickly up to the value 0 so that an impermissible loading up of the feed water container 1 can be avoided. A control of the entire operation can be effected in branch conduits 27, 28, 29 and 30 by means 27″, 28″, 29″ and 30″ of measuring the feed water partial flows in the orifices 27′, 28′, 29′ and 30′.

The system of in-series arrangement of heating surfaces which, during normal operation are in parallel arrangement, with continuous transgression of one control type itno the other control type can also be applied to other heating surfaces of the boiler so that always those parts which are endangered by too high heat absorption will be acted upon by a correspondingly high density of the flowing mass. The control valves 23 and 25 are merely to indicate that through auxiliary conduits 24, 26 it is possible to obtain a better control and adjustment of the entire circuit.

It is, of course, to be understood, that the present invention is, by no means, limited to the particular arrangement shown in the drawing, but also comprises any modifications within the scope of the appended claims.

What I claim is:

1. A steam producing plant having a main line with feed water supplying means and with pre-heater means adapted to be supplied with feed water from said feed water supplying means, and with heating surface means adapted to be heated by steam, which includes: conduit circuit means interposed between said pre-heater means and said heating surface means, said conduit circuit means comprising a first branch and a second branch each branching off from said main line and including a branch line shut-off valve and an evaporator and a steam and water separating device, additional conduit means leading from said separating devices to said heating surface means for conveying thereto steam separated in said separating devices, auxiliary conduit means adapted to establish communication between said separating device in said first branch and said separating device in said second branch to convey water separated in said separating device of said first branch to said separating device of said second branch, and return conduit means establishing communication between the separating device of said second branch and said feed water supply means for conveying thereto water separated in said separating device of said second branch.

2. A plant according to claim 1, which includes further conduit means leading from one separating device to the other separating device to convey separated steam from the separating device in said first branch to the separating device in said second branch.

3. A plant according to claim 2, which includes a shut-off valve interposed in said further conduit means.

4. A plant according to claim 1, which includes a shut-off valve means in said additional conduit means.

5. A plant according to claim 1, which includes shut-off valve means in said auxiliary conduit means.

6. A plant according to claim 1, which includes withdrawing conduit means respectively communicating with said separating devices for selectively withdrawing separated water therefrom.

7. A plant according to claim 6, in which said withdrawing conduit means respectively comprise shut-off valve means.

8. A plant according to claim 1, in which at least said branches include orifice means and measuring means associated therewith for controlling the valves in said branches.

References Cited

UNITED STATES PATENTS

| | | |
|---|---|---|
| 3,162,179 | 12/1964 | Strohmeyer. |
| 3,213,834 | 10/1965 | Heathcote et al. ____ 122—406 X |
| 3,368,533 | 2/1968 | Knizia _____ 122—406 |

FOREIGN PATENTS

| | | |
|---|---|---|
| 693,330 | 6/1953 | Great Britain. |

CHARLES J. MYHRE, Primary Examiner